(12) United States Patent
Parker

(10) Patent No.: US 6,399,130 B2
(45) Date of Patent: Jun. 4, 2002

(54) METHOD OF AND LINE FOR BREADCRUMB PRODUCTION

(75) Inventor: Thomas Robertson Parker, Swansea (GB)

(73) Assignee: Sasib UK LTD, Merseyside (GB)

( * ) Notice: Subject to any disclaimer, the term of this patent is extended or adjusted under 35 U.S.C. 154(b) by 0 days.

(21) Appl. No.: 09/760,109

(22) Filed: Jan. 12, 2001

(30) Foreign Application Priority Data

Jan. 12, 2000 (GB) .............................................. 0000512

(51) Int. Cl.[7] .......................... A21C 15/00; A21D 8/00
(52) U.S. Cl. .......................... 426/496; 99/357; 99/510; 426/497; 426/518
(58) Field of Search .................................. 426/496, 497, 426/502, 518; 99/357, 494, 510; 425/294, 363

(56) References Cited

U.S. PATENT DOCUMENTS 5,240,731 A * 8/1993 Bornhorst et al. .......... 426/497
5,284,514 A * 2/1994 Griffiths ..................... 426/518

* cited by examiner

*Primary Examiner*—George C. Yeung

(57) ABSTRACT

The invention is concerned with a method of manufacture of bread crumb and with a production line for bread crumb manufacture, the method comprising the steps of preparing and sheeting a dough, disposing the sheeted dough on a conveyor and deforming the sheeted dough back and forth to form the dough into an undulating configuration, baking the dough by conveying same through a tunnel oven and converting the baked dough into bread crumb.

8 Claims, 2 Drawing Sheets

METHOD OF AND LINE FOR BREADCRUMB PRODUCTION

Figure 1:
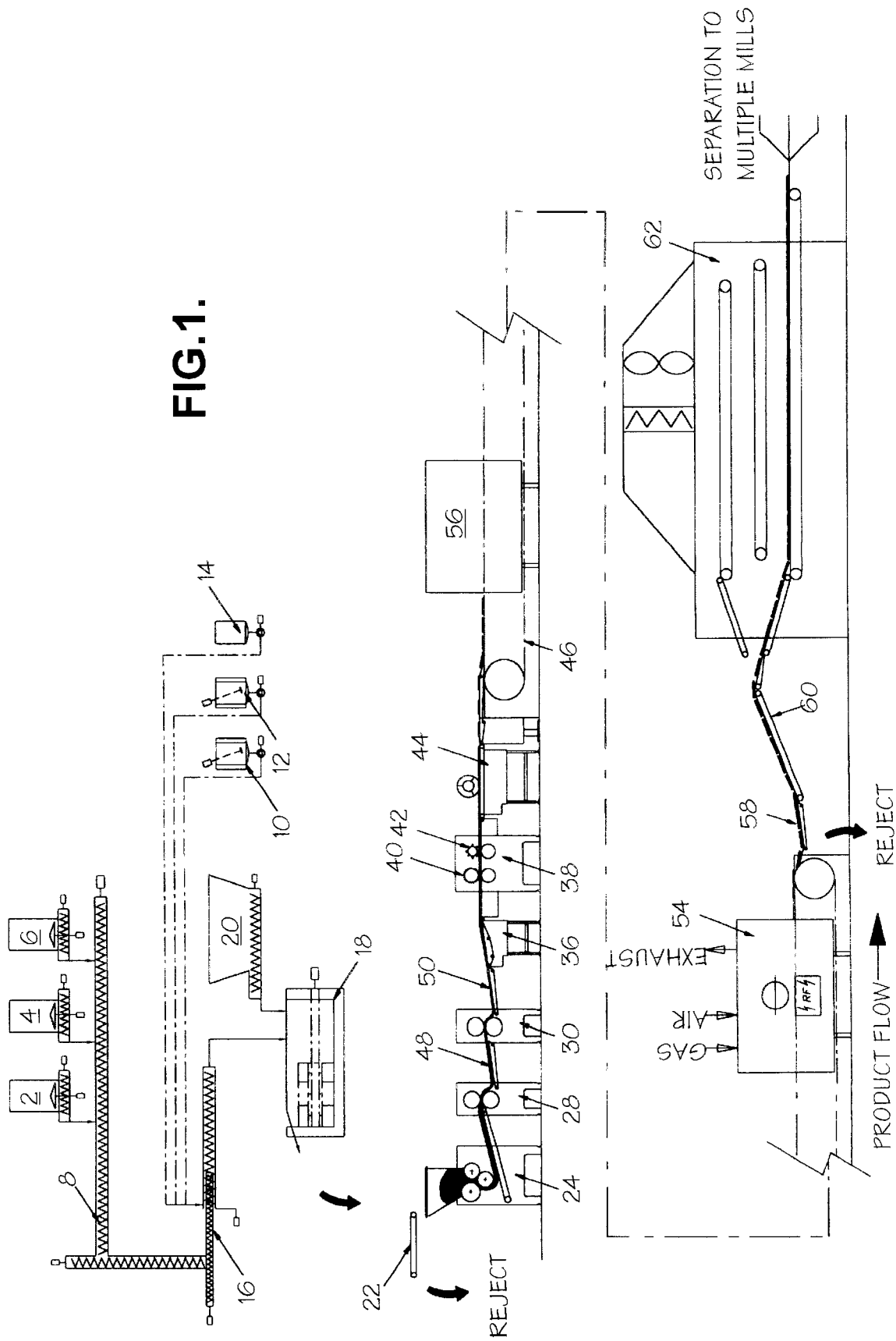

The present invention is concerned with a method of manufacture of breadcrumb and with a production line for breadcrumb manufacture, and particularly (but not exclusively) with a method and production line for manufacture of Japanese breadcrumb.

Breadcrumb products have numerous variations but basically fall into three categories which are currently usually all made on dedicated production plants:
i. American breadcrumb;
ii. Japanese breadcrumb; and
iii. Cracker meal or rusk.

American breadcrumb can be made on a conventional tin bread plant or by sheeting dough then proving and baking before cooling, grinding and drying the finished product. A lightly coloured golden crust is usually required, contributing colour to the crumb itself, and results from either conventional baking in an oven or toasting in the dryer.

Cracker meal or rusk is made from a high density dough which is sheeted and baked then ground, dried and milled. The dough sometimes has a coloured crust, resulting from its conventional baking, which contributes to the colour of the resulting crumb.

No crust is wanted on Japanese breadcrumb and it is currently made in the following continuous processes:

a. Bread dough pieces are moulded and several pieces are placed in a container with two sides forming electrodes. The pieces are proved then baked by passing an electric current through the dough, a process which creates heat within the dough and avoids formation of crust on its exterior. The growth of the dough pieces is constrained by the container assisting in forming the resulting grain structure in the bread in one direction. The dough pieces are cooled to set the grain structure then ground and dried.

b. The bread dough can also be mixed and structured in an extruder, a continuous mixer or batch mixer. The resulting dough is formed to give an elongated grain structure then baked using a microwave tunnel oven to give no crust. The dough pieces are cooled to set the grain structure then ground and dried.

In each case the result is a distinctive low density, needle-shaped crumb with no crust content.

In method (a) the pre forming and the constraint of the growth of the dough during baking is important in giving the resulting crumb its characteristic properties, including its shape. However the provision of containers for the dough creates its own difficulties where the method is to be implemented on an industrial scale, not least because it demands a specialised production line not suited to production of other types of crumb.

A first objective of the present invention is to provide a method and apparatus suitable for manufacture of Japanese crumb which does not utilise containers for constraint of the dough during baking. It is particularly desired that the method and apparatus should be capable of continuous throughput.

In accordance with a first aspect of the present invention there is a method of breadcrumb manufacture comprising:
preparing dough;
sheeting the dough;
disposing the sheeted dough on a conveyor and deforming the sheeted dough back and forth to form the dough into an undulating configuration;
baking the dough by conveying same through a tunnel oven; and
converting the baked dough into breadcrumb.

Where the method is used for manufacture of Japanese breadcrumb, the configuration of the dough on the baking conveyor can be such that adjacent regions of the dough which are upstanding from the conveyor contact, whereby the dough constrains itself during baking. The adjacent upstanding regions of the dough may be in contact prior to baking or may be close enough together to come into contact as the dough expands during baking. In either case the result is that the dough can expand upwardly away from the conveyor but is constrained at least to some degree against expansion in other directions, thereby maintaining the grain structure required for Japanese crumb.

The oven may be an air radio frequency assisted oven. This type of oven will be referred to herein by the letters ARFA.

The undulating configuration of the dough can also be beneficial during manufacture of other types of crumb since it allows a sheet of dough to be compactly arranged on the baking conveyor, thereby improving the volume throughput of dough which can be achieved by the oven.

The undulating configuration of the sheeted dough is straightforwardly achieved, in a particularly preferred method according to the present invention, by passing the dough from a transit conveyor onto a subsequent conveyor with the transit conveyor running at a higher speed than the subsequent conveyor.

Trials have shown that in this way a regularly formed undulating configuration can be reproducibly achieved. By adjusting sheet thickness and conveyor speed differentials in the structure and texture of the resulting baked dough can be varied.

In accordance with a second aspect of the present invention there is a line for breadcrumb production comprising:
means for preparing dough or for receiving pre-prepared dough;
means for sheeting the dough;
means for disposing the sheeted dough on a baking conveyor and deforming the sheeted dough back and forth to form the dough into an undulating configuration upstanding from the conveyor's surface;
a tunnel oven through which the baking conveyor is arranged to convey the dough to bake same; and
means for converting the baked dough into breadcrumbs.

The modes of heating currently used for Japanese crumb manufacture also give rise to problems. Method (a) above, involving ohmic heating of the dough, does not allow in line cleaning and moisture is rapidly released from the containers during baking. This moisture condenses since the baking enclosure is not above 100° C. and the condensed liquid combines with pieces of unbaked dough to create an unhygienic environment.

When using microwave heating as in method (b), it is important that the microwaves be adequately contained, in order to comply with regulations concerning emissions and safety. Containment of microwaves is not straightforward with continuous throughput ovens, which must have openings through which the product can enter and leave the baking chamber. In addition the penetration of microwaves into the dough is limited. The result is that while Japanese crumb can be manufactured commercially using microwave baking, the throughput of known systems is limited.

According to a particularly preferred aspect of the present invention, baking of the dough involves heating same by means of radio frequency electromagnetic radiation.

Baking by use of radio frequencies is not in itself a new technique and has previously been applied in baking. One advantage of radio frequency heating as compared with microwave heating is that radio waves attenuate less rapidly into the dough, so that more even heating can be achieved.

The use of radio frequency heating in the above described method and production line is however particularly advantageous in manufacture of Japanese breadcrumb. Containment of radio frequency radiation can be achieved in a continuous throughput oven having relatively large openings (as compared with continuous throughput microwave ovens) and because radio waves heat volumetrically they do not create a crust on the exterior of the dough. Hence this preferred aspect of the present invention allows Japanese breadcrumb to be manufactured, on a full scale production line with high throughput and without the above described disadvantages of other methods.

Figure 2:
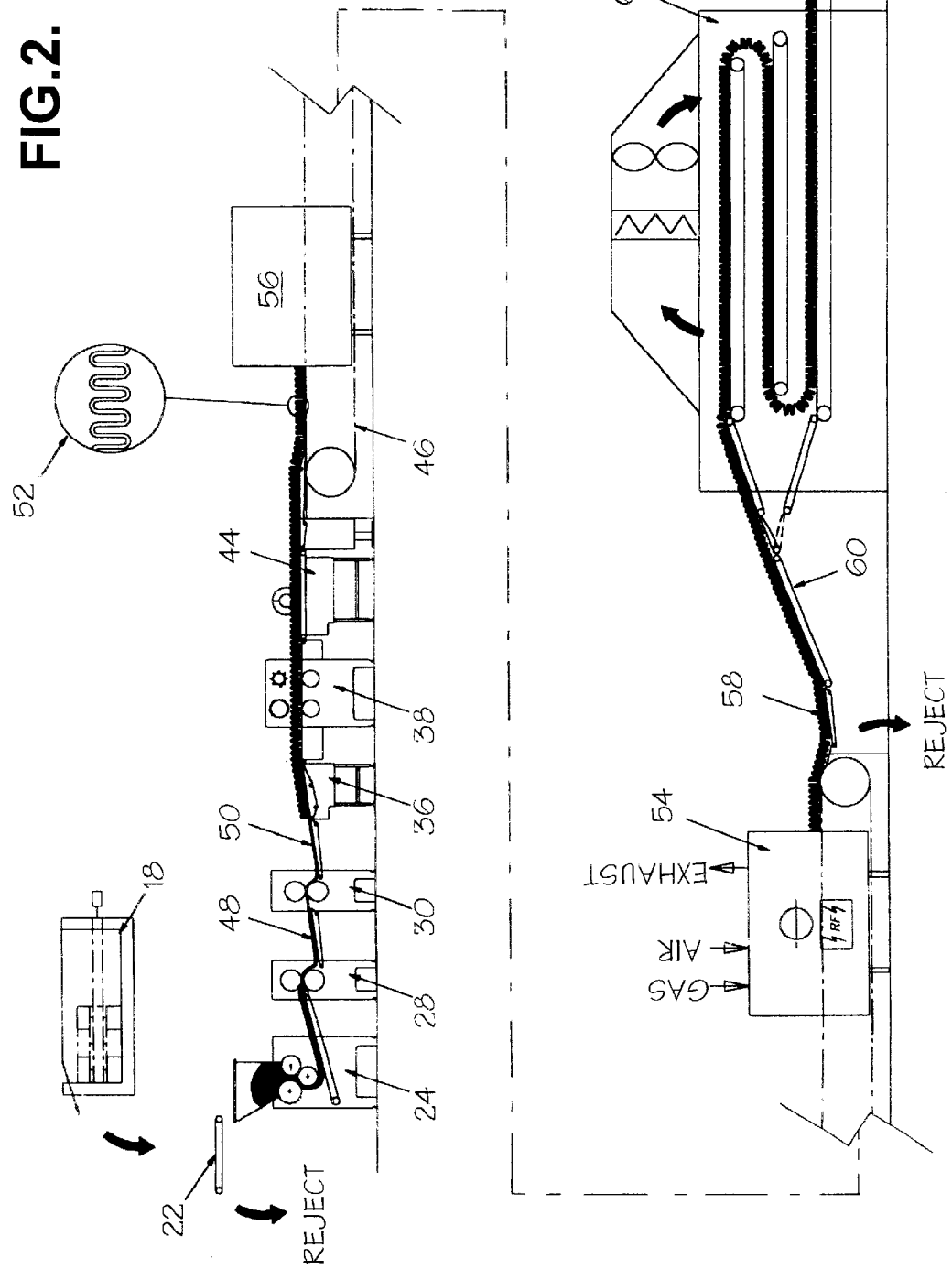

Specific embodiments of the present invention will now be described, by way of example only, with reference to the accompanying drawings, in which:

FIG. 1 illustrates schematically a production line constructed and arranged according to the present invention for production of American breadcrumb or for cracker crumb; and FIG. 2 illustrates the same production line for production of Japanese breadcrumb.

The illustrated production line can be used for production of Japanese, American or cracker crumb.

Batch or continuous dough mixing can be used. Continuous mixing apparatus is illustrated in FIG. 1 and comprises hoppers for feeding flour 2, salt 4 and additives 6 to a screw conveyor 8 into which are fed colour 10 (optional), yeast 12 and water 14, the resulting combination being fed via a mixer 16 to a kneader 18. Fines recovered from later stages of the line are also returned to the kneader via a feeder 20. The dough output from the kneader is fed by a high level conveyor 22 to a three roll sheeter 24. The conveyor 22 has a retracting nose to provide a reject facility into a tub for start-up and colour changes.

The mixer is capable of producing the different doughs for the above different crumb types with reduced water content to normal. Such reduced water content dough has been successfully processed in trials of the line and reduces energy for drying down the line.

The three roll sheeter 24 transforms the dough mass into a sheet. The final sizing rollers has flanges which ensure a straight edge. An integral conveyor transports the sheet to gauge roll machines.

Different conditions then apply for the three different types of crumb to be made.

For American breadcrumb production (illustrated in FIG. 1), a pair of gauge rolls 28, 30 roll the sheet down to final thickness for baking.

A relaxation conveyor 36 transports the resulting sheet at a line speed matching that of the rollers to a rotary cutter 38. In the present embodiment this is a twin roll rotary cutter containing two different docking rollers 40, 42 One of the docking rollers has a dense pattern of small pins to dock the top surface of the sheet to prevent blistering. The heavy duty docker will contain toothed wheels designed for pinning through the dough sheet.

The sheet is transferred to a panner on a short conveyor having pastry cutting knives to split the sheet into strips and a rotary knife or guillotine to cut the sheet transversely into strips. This separation is to ease feeding separate mills at the grinding stage of the plant, the number of which depends on the throughput of the plant.

The swivel panner transfers the dough pieces to the centre of an oven belt 46. Some separation of the dough pieces can be achieved by a slightly faster oven belt speed.

The line illustrated in FIG. 1 is also used for production of cracker meal and the process is in many respects similar to that used for American breadcrumb manufacture. Differences in the processes are described below.

For cracker meal the dough sheet is reduced down to final thickness through application of the gauging rollers 28, 30.

The relaxation conveyor 36 transports the sheet at the same line speed to the rotary cutter 38, having two different docking rollers. One contains a dense pattern of small pins to dock the top surface of the sheet to prevent blistering. The heavy duty docker will contain toothed wheels designed for pinning through the dough sheet. If this secondary docking is not required, the second roller can be removed.

The sheet is transferred to the panner and cut as described above for American breadcrumb to ease feeding separate mills at the grinding stage of the plant after the oven. The dough pieces are then conveyed to the oven.

FIG. 2 illustrates the same line seen in FIG. 1 being used for Japanese breadcrumb production, the components of the line being the same in FIG. 2 as in FIG. 1 and bearing the same reference numerals. In Japanese crumb production the dough sheet is rolled to reduce in thickness by the first gauge roller 28 and to approximately 6 mm (¼") thick by the second gauge roller 30.

Transfer conveyors 48, 50 after both gauging operations are in Japanese crumb production run slightly faster than the surface speed of the rollers to encourage an elongated cell structure in the dough sheet. The relaxation conveyor 36 is slowed relative to the transfer conveyor 50 before it. The relaxation conveyor may for example be run about one third as fast as the transfer conveyor. The sheet of dough is conveyed from the transfer conveyor 50 onto the relaxation conveyor 36 and due to the speed differential a regular ripple is formed as seen in FIG. 2, particularly in the enlargement 52. This ripple is conveyed at the same slower speed through the rotary cutter, although docking is not required in the current process so both rollers of the cutter can be removed or bypassed. The rippled sheet is transferred to conveyor 44 containing pastry cutting knives to split the sheet into equal strips. This separation is to ease feeding separate mills at the grinding stage of the plant, the number of which depend on the throughput.

The swivel panner transfers the dough pieces to the centre of the oven belt 46. All subsequent conveyors run at the same speed to avoid the risk of unravelling the ripple formation.

The same oven 54 is used for production of all three types of crumb and is preceded in the illustrated line by a resting section or optional proofer 56. The dough is conveyed through both on a baking band. A stainless steel mesh belt is preferred to avoid any discolouration from oxidisation of the belt and minimise energy losses during ARFA baking.

The oven is based on a known direct gas fired convection oven but additionally comprises a facility for baking by application of radio frequency electromagnetic radiation. To this end paired electrodes are provided on either side of the conveyor belt within the oven. Typically one of the electrode pairs is earthed while to the other is applied the necessary high tension RF signal. Differing combinations of convective and RF heating are utilised in baking of the different crumb types. For Japanese crumb manufacture baking is predominantly by RF in order to avoid formation of an unwanted coloured crust on the dough exterior. For American breadcrumb manufacture, a higher oven temperature can be used in order to form a crust and colour.

At the delivery end of the oven, for all three crumb types, a stripping blade peels the baked product off the baking band and a stripping conveyor 58 transports it to handling conveyors. Slitting knives are fitted to the conveyor 58 to align with the cuts made before baking and this re-separates the sheet into separate streams if baking has caused it to re-join. Because of the alignment with cuts made before baking, this will reduce and damage the to baked product structure. The stripping conveyor has a retracting nose and a cross conveyor to allow product to be rejected at this point if required.

The sheet sections are transported up an incline conveyor 60 to a cooler 62. Illustrated is a multi-pass cooler with a chilled air recirculation system feeding discrete plenum chambers in which the product pieces are turned at each end. These machines are available in a three or five pass option with a facility to pass straight through on the bottom pass conveyor. When in American crumb or cracker meal mode, the cooling system can be shut down and the single pass conveyor run at full speed to provide the minimum residence time for these products. By keeping these products hot, the energy required at the drying stage is minimised. Although a degree of cooling can be applied if desired.

At the end of the cooler the product sheets are separated into distinct streams which are fed to separate grinding mills (not illustrated). This is because the size and geometry of the mill has an effect on crumb sizing and the plant throughput dictates what number of mills will be required. Resulting crumb can be lifted by suction or bucket elevators for drying and other post shredding operations which again have many similarities for the different crumb types described above.

What is claimed is:

1. A method of bread crumb manufacture comprising:
   preparing a dough;
   sheeting the dough;
   disposing the sheeted dough on a conveyor and deforming the sheeted dough back and forth to form the dough into an undulated configuration;
   baking the undulated dough by conveying same through a tunnel oven; and
   converting the baked dough into bread crumb.

2. The method according to claim 1 wherein the configuration of the dough on a baking conveyor is such that adjacent regions of the dough are upstanding from the conveyor contact, whereby the dough constrains itself during baking.

3. The method according to claim 1 or 2 wherein the oven is an air radio frequency assisted oven.

4. The method according to claim 1 wherein the undulating configuration of the sheeted dough is achieved by passing the dough from a transit conveyor onto a subsequent conveyor with the transit conveyor running at a higher speed than the subsequent conveyor.

5. The method according to claim 2 wherein the undulating configuration of the sheeted dough is achieved by passing the dough from a transit conveyor onto a subsequent conveyor with the transit conveyor running at a higher speed than the subsequent conveyor.

6. The method according to claim 3 wherein the undulating configuration of the sheeted dough is achieved by passing the dough from a transit conveyor onto a subsequent conveyor with the transit conveyor running at a higher speed than the subsequent conveyor.

7. A line for bread crumb production comprising:
   means for preparing dough or for receiving pre-prepared dough;
   means for sheeting the dough;
   means for disposing the sheeted dough on a baking conveyor and deforming the sheeted dough back and forth to form the dough into an undulating configuration upstanding from the conveyor's surface;
   a tunnel oven through which the baking conveyor is arranged to convey the undulated dough to bake same; and
   means for converting the baked dough into bread crumb.

8. The line for bread crumb production according to claim 7 further comprising a deactivating means for the means for deforming, wherein the means for deforming the sheeted dough back and forth can be deactivated by the deactivating means so that the sheeted dough is disposed on the baking conveyor in a flat configuration.

* * * * *